Feb. 1, 1949.  A. C. KRACKLAUER  2,460,423
FILTER
Filed March 26, 1945
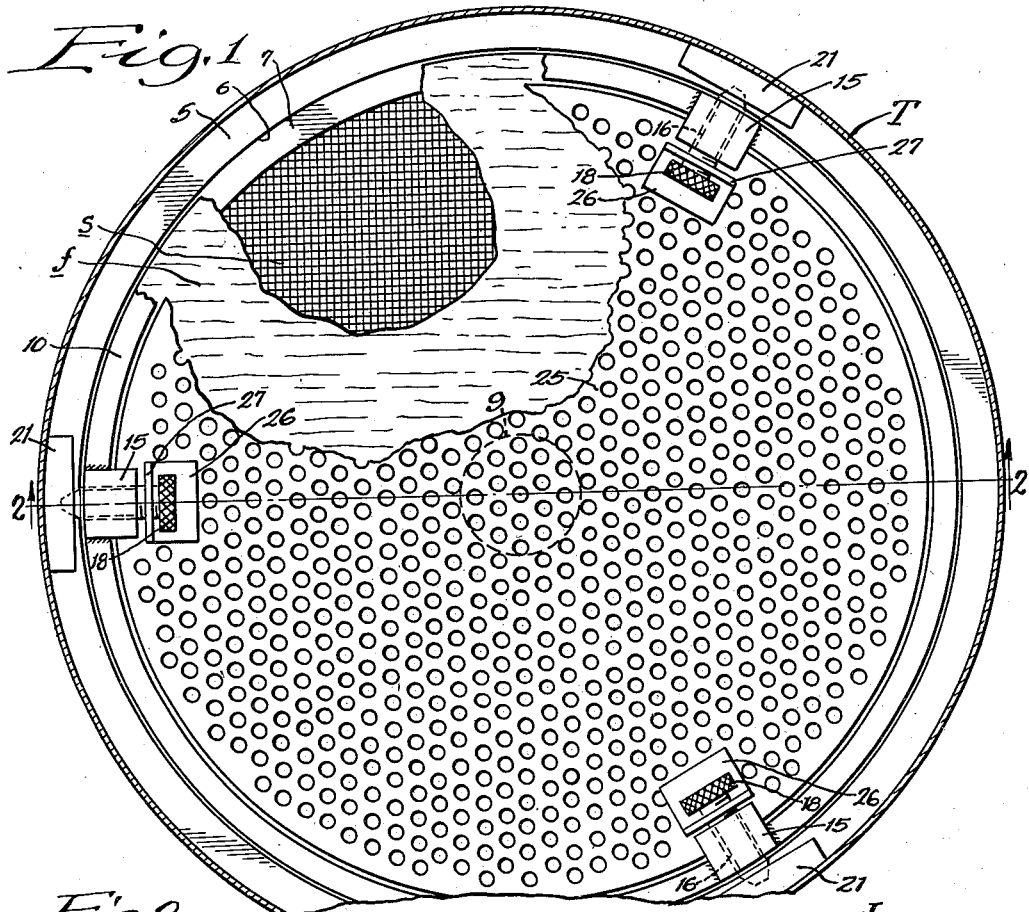
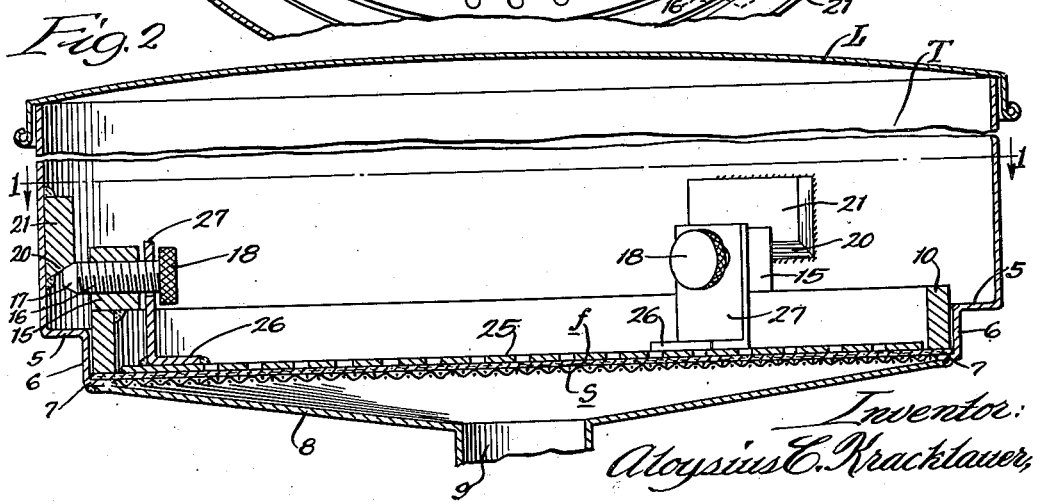
Inventor:
Aloysius C. Kracklauer,
By Hemming & Hemming & Robertson
Attorneys.

Patented Feb. 1, 1949

2,460,423

UNITED STATES PATENT OFFICE 2,460,423

FILTER

Aloysius C. Kracklauer, Mundelein, Ill., assignor, by mesne assignments, to Sparkler Mfg. Co., Mundelein, Ill., a corporation of Illinois Application March 26, 1945, Serial No. 584,899

8 Claims. (Cl. 210—158)

This invention which relates generally to filters is concerned specifically with certain improvements by which to removably secure a stirring screen and also the filtering elements in place within the tank wherein liquid is introduced to be filtered. Such features are desirable in many installations and for the treatment of liquids of many kinds. For example, the present filter has many advantages in laboratories, and in the treatment of edible oils, and various chemicals many of which leave a dry residue. The stirring screen upon which a filter aid may be deposited is so disposed as not to interfere with the filter elements which may be any suitable paper or cloth, or both, combined with a fine mesh screen. The problem which I have solved by the present improvements is the provision in a filter of a simple, inexpensive and efficient type of mounting for the stirring screen and for the filter elements in a convenient manner which will permit of ready application or removal thereof, and which will securely hold these several parts in an effective operative position while preventing any by-passing of the liquid therearound.

An exemplification of my invention is set forth in the accompanying drawing wherein Figure 1 is a horizontal section through the filter tank taken on line 1—1 of Figure 2; and Figure 2 is a vertical section through the filter tank and filter elements therewithin taken on line 2—2 of Figure 1.

As shown, the filter comprises a tank T having its open top covered by a removable lid L, the tank being provided interiorly with an annular ledge 5 joining with a depending inset wall 6 which is formed with an inturned flange 7 to the under face of which is affixed a bottom 8 which slopes downwardly toward a central drain opening 9. Upon the flange 7 which is, in effect, a seat is rested the edge portion of a filter element f, such as a sheet of filter paper, cloth or the like, which is supported elsewhere over its entire surface by an underlying screen s whose upper face is substantially flush with that of the seat. The peripheral edge of the filter element extends practically to the inset wall 6 of the tank adjacent which is removably fitted a sealing ring 10 which rests upon the edge portion of the filter element at every point peripherally thereof and directly over the seat. The weight of this ring which exerts a pressure upon the filter element acts effectively to prevent any by-passing of liquid around the edges thereof.

The sealing ring is provided with a plurality of upstanding lugs 15, three being shown, each formed with a radial opening which is threaded for operative engagement therewithin of a bolt 16 whose outer acting end 17 is desirably coned. The opposite end of each bolt may be formed with a knurled head 18 to facilitate manual rotation thereof. In operative relation with the coned end of each bolt is the beveled under face 20 of a block 21 which is affixed securely, as by welding, to the inside of the tank.

I have also provided a stirring screen 25 adapted to be fitted into the tank close to its bottom. This screen, here shown as a perforated plate, is desirably supported just off the filter element f by means of angle brackets each having (1) a foot 26 welded or otherwise secured to the plate and (2) an upstanding leg 27 which is apertured to receive therethrough the bolt 16 by which it is supported. By using several such brackets positioned for cooperation with the several bolts which hold the sealing ring in place, it is possible to provide for the stirring screen an adequate support without the addition of any extra parts. The stirring screen which is fixedly supported within the sealing ring may accordingly be handled as a unit therewith, either within or outside the tank.

After placement of the supporting screen s and filter element upon their respective seats, the sealing ring together with its supported stirring screen 25 will be introduced into the tank and turned to a rotative position where the bolts 16 are misaligned with respect to the blocks 21. Optionally the bolts may be retracted axially a distance sufficient to clear the blocks, or be removed therefrom preliminary to insertion through the bracket apertures to enable the sealing ring 10 and the stirring screen 25 to be fitted in place. The ring is then shifted to locate the bolts opposite the blocks after which the bolts are advanced through a turning movement to present their coned ends against the beveled under faces of the blocks. Forward rotation of the bolts will produce a downward pressure on the sealing ring which in turn is clamped upon the filter element while resting upon the supporting seat therefor. In this way I am able to secure the filter element tightly and with uniform pressure upon the seat so as to prevent any by-passing of liquid therearound. For removal of the filter element the operations are reversed in order, it being a simple matter to disconnect and free all parts for this purpose.

It will be noted that the filter element, whether it be of paper, cloth, or other material, is sustained across the span of the annular seat by the supporting screens which is itself supported on its own seat (i. e. the tank bottom) at a slightly lower elevation. The difference in levels of the two seats is about equal to the thickness of the supporting screen so that its top face lies substantially flush with the top face of the annular seat for the filter element. In this way a continuous one-level support is afforded for the filter element, extending over its entire surface. In referring to a "screen" i. e. the supporting screen s I have in mind any equivalent thin foraminous or perforated plate or woven structure through which the filtered liquid may freely pass, such a device affording also a sustaining support for the filter element, usually flexible, over its entire surface except in the peripheral region. The stirring screen when supported in place over the filter element constitutes in effect, a false bottom whereon filter aid or other solid material may be stirred without detriment to the filter element.

The coacting bolts and blocks herein shown are typical of a simple and effective form of locking device that is suitable for the purpose of this invention. It is important that one of the two locking elements be fixedly positioned to the outside of the ring whose diameter is somewhat less than that of the tank interior to provide the necessary space therefor. By such an arrangement the sealing ring is free to move into or out of the tank past such fixed elements. The supporting screen s is also centered in place upon the bottom by reason of the flange which lies in surrounding relation thereto. The assembly of all parts may accordingly proceed expeditiously since correct positioning is definitely assured.

This application is a continuation to part of an earlier case which I filed February 18, 1944, Serial No. 522,861.

I claim:

1. The combination with a filter having a tank provided therein at a point below its top with an annular seat, of a ring adapted to rest upon the seat and be supported thereby, a filter element supported in place between the ring and seat, a plurality of blocks affixed interiorly to the tank at a common elevation above the ring and each formed with a beveled under face, and a plurality of screw means, one for each block, carried by the ring and movable radially toward and from the beveled block faces for variable engagement therewith to transmit therefrom downward pressures at spaced points against the ring whereby to clamp the filter element tightly upon the seat.

2. The combination with a filter having a tank provided in its bottom region with an annular seat whereon is supported a filter element, of a sealing ring resting upon the filter element at a point directly above the seat and of less diameter than the tank walls thereabove, and coacting locking means on the ring and tank comprising parts extending radially to points inside of the ring, for holding the ring with pressure against the filter element at every point over the seat, a stirring screen arranged over the filter element, and means extending upwardly from the stirring screen in supporting engagement with the radial parts whereby to sustain the stirring screen above the filter element.

3. The combination with a filter having a tank provided therein at a point below its top with an annular seat, of a sealing ring adapted to rest upon the seat and be supported thereby, a filter element supported in place between the sealing ring and seat, a plurality of blocks affixed interiorly to the tank at points above the ring, a plurality of screw means, one for each block, carried by the ring and adjustable radially toward and from the block for engagement therewith, each block being formed with a beveled face opposite one screw means whereby, upon receiving engagement therefrom, to transmit a downward thrust upon the ring to clamp the filter element tightly upon the seat, a stirring screen arranged loosely within the ring, and means connecting the stirring screen and screw means for sustaining the former at a fixed elevation spaced from the filter element.

4. The combination with a filter having a tank provided therein at a point below its top with an annular seat, and a filter element arranged on the seat, of a ring located above the seat and resting upon the filter element and of less diameter than the tank walls above the seat, a plurality of blocks affixed to the tank at points above the ring and confined to the space beyond the outside diameter of the ring, and a plurality of screw means one for each block carried by the ring and adjustable radially toward and from the block for engagement therewith, each block being formed with a beveled face opposite one screw means, whereby upon receiving engagement therefrom, to transmit a downward thrust upon the ring to clamp the filter element tightly upon the seat.

5. The combination with a filter having a tank provided therein at a point below its top with an annular seat, and a filter element arranged on the seat, of a ring located above the seat and resting upon the filter element and of less diameter than the tank walls above the seat, and two sets of coacting means one of which is screw threaded and movable toward and from the other and the other of which is provided with means for translating in a direction towards the tank bottom motion imparted from the screw threaded means, one set of the coacting means being affixed to the tank within the space to the outside of and above the ring and the other set of coacting means being carried by the ring.

6. The combination with a filter having a tank provided in its bottom region with an annular seat and a filter element arranged on the seat, of a ring located above the seat and resting upon the filter element and of less diameter than the tank walls above the seat, a screen resting upon the tank bottom and in supporting engagement with the filter element, the upper face of the screen lying in a plane substantially the same as the upper face of the seat but terminating peripherally adjacent thereto, a set of elements fixedly carried on the ring and another set of elements fixedly mounted on the tank, and screw means carried by the elements on the ring and arranged to adjustably engage the elements on the tank, one of the engaging portions being beveled whereby the screw means is adapted to transmit a downward pressure upon the ring and clamp the filter element tightly on the seat.

7. The combination with a filter having a tank provided in its bottom region with an annular seat and a filter element arranged on the seat, of a ring located above the seat and resting upon the filter element and of less diameter than the tank walls above the seat, a screen resting upon the tank bottom and in supporting engagement with the filter element, the upper face of the screen lying in a plane substantially the same as the upper face of the seat but terminating peripherally adjacent thereto, a set of elements fixedly carried on the ring and another set of elements fixedly mounted on the tank, and screw means carried by the elements on the ring and arranged to adjustably engage the elements on the tank, one of the engaging portions being beveled whereby the screw means is adapted to transmit a downward pressure upon the ring and clamp the filter element tightly on the seat, the elements affixed to the tank being located within the space outside of the ring to effect clearance for upward movement of the ring when the screw means is withdrawn from engagement with the elements fixed to the tank.

8. The combination with a filter having a tank provided in its bottom region, and a filter element arranged on the seat, of a sealing ring resting upon the filter element at a point directly above the seat, a stirring screen seated within the ring, radially movable adjustable devices carried by the sealing ring, and devices immovably fixed to the tank wall engageable by the adjustable devices, one of the devices being beveled and the adjustable devices operating through engagement with the fixed devices to hold the sealing ring with pressure against the filter element at every point over the seat.

ALOYSIUS C. KRACKLAUER.

REFERENCES CITED

The following references are of record in the file of this patent:

UNITED STATES PATENTS

| Number | Name | Date |
|---|---|---|
| 1,524,550 | Heyser | Jan. 27, 1925 |
| 1,652,970 | Workman | Dec. 13, 1927 |
| 1,958,701 | Hois | May 15, 1934 |
| 2,313,237 | Hois | Mar. 9, 1943 |